(12) United States Patent
Kim

(10) Patent No.: US 9,817,437 B2
(45) Date of Patent: Nov. 14, 2017

(54) STRETCHABLE DISPLAY DEVICE

(71) Applicant: SAMSUNG DISPLAY CO., LTD., Yongin, Gyeonggi-Do (KR)

(72) Inventor: Young Chan Kim, Incheon (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 300 days.

(21) Appl. No.: 14/799,977

(22) Filed: Jul. 15, 2015

(65) Prior Publication Data

US 2016/0212837 A1    Jul. 21, 2016

(30) Foreign Application Priority Data

Jan. 15, 2015  (KR) .......................... 10-2015-0007613

(51) Int. Cl.
  *G06F 1/16*  (2006.01)
(52) U.S. Cl.
  CPC ............ *G06F 1/163* (2013.01); *G06F 1/1652* (2013.01)
(58) Field of Classification Search
  CPC ..... A44C 5/0015; A44C 5/0053; A61B 5/681; G06F 1/163; G06F 1/1652; G09F 9/301; G09G 2320/0626; G09G 2380/02; H01L 51/0097
  See application file for complete search history.

(56) References Cited

U.S. PATENT DOCUMENTS

| | | | | |
|---|---|---|---|---|
| 7,441,415 B2* | 10/2008 | Radley-Smith | ...... | A44C 5/0015 345/46 |
| 9,110,498 B2* | 8/2015 | Martinez | ................ | A61B 5/681 |
| 9,274,507 B2* | 3/2016 | Kim | ....................... | G04G 21/02 |
| 9,521,245 B2* | 12/2016 | Yang | ..................... | G04G 21/04 |
| 2010/0219943 A1* | 9/2010 | Vanska | .................... | G06F 1/163 340/407.1 |
| 2013/0044215 A1* | 2/2013 | Rothkopf | ................ | G06F 1/163 348/143 |
| 2014/0138637 A1* | 5/2014 | Yang | ..................... | H01L 27/1218 257/40 |

FOREIGN PATENT DOCUMENTS

| | | |
|---|---|---|
| JP | 2007-167190 A | 7/2007 |
| KR | 10-2014-0000423 A | 1/2014 |
| KR | 10-2014-0022180 A | 2/2014 |
| WO | WO 0025193 A3 * 7/2001 ............... G06F 3/14 |

* cited by examiner

*Primary Examiner* — Hargobind S Sawhney
(74) *Attorney, Agent, or Firm* — Lee & Morse, P.C.

(57) ABSTRACT

A stretchable display device including a stretchable display to display an image, the stretchable display having a band shape; holes on an outwardly facing surface of the stretchable display; and a stopper on an inwardly facing surface of the stretchable display, the stopper being coupleable with any one of the holes to loop the stretchable display device in a ring form, wherein a size of an image display area of the stretchable display is controllable based on a current value that depends on a position of a hole to which the stopper is coupled.

12 Claims, 6 Drawing Sheets

STRETCHABLE DISPLAY DEVICE

CROSS-REFERENCE TO RELATED APPLICATION

Korean Patent Application No. 10-2015-0007613, filed on Jan. 15, 2015, in the Korean Intellectual Property Office, and entitled: "Stretchable Display Device," is incorporated by reference herein in its entirety.

BACKGROUND

1. Field

Embodiments relate to a stretchable display device.

2. Description of the Related Art

As society enters an information era in earnest in recent years, a display field which processes massive information and displays the information has been rapidly developed. To keep pace therewith, various display devices have been developed and have been in the limelight.

As the display device, a liquid crystal display (LCD), a plasma display panel (PDP), a field emission display (FED), an electroluminescence display (ELD), and the like have been developed. These display devices have been progressed to a direction in which thinness, weight reduction, low power consumption, and the like are implemented.

The above information disclosed in this Background section is only for enhancement of understanding of the background of the invention and therefore it may contain information that does not form the prior art that is already known in this country to a person of ordinary skill in the art.

The above information disclosed in this Background section is only for enhancement of understanding of the background of the invention and therefore it may contain information that does not form the prior art that is already known in this country to a person of ordinary skill in the art.

SUMMARY

Embodiments are directed to a stretchable display device.

The embodiments may be realized by providing a stretchable display device including a stretchable display to display an image, the stretchable display having a band shape; holes on an outwardly facing surface of the stretchable display; and a stopper on an inwardly facing surface of the stretchable display, the stopper being coupleable with any one of the holes to loop the stretchable display device in a ring form, wherein a size of an image display area of the stretchable display is controllable based on a current value that depends on a position of a hole to which the stopper is coupled:

The stretchable display may include a resistor of which a resistance value is changeable depending on the position of the stopper; a power supply connected to the resistor; and an ampere meter to measure the value of the current flowing in the resistor, the ampere meter being connected to the power supply, and the resistor, the power supply, and the ampere meter may form a closed circuit with the stopper when the stopper is coupled with the hole.

The stretchable display may further include a controller to control the size of the image display area of the stretchable display based on the current value measured by the ampere meter.

The holes may include upper holes at one outer edge of the stretchable display and lower holes at an opposite outer edge of the stretchable display, the stopper may include an upper stopper and a lower stopper, and one of the upper holes and a laterally adjacent one of the lower holes may configure one pair, and the upper hole and the lower hole of the one pair may be coupled with the upper stopper and the lower stopper of the stopper.

The embodiments may be realized by providing a stretchable display device including a stretchable display to display an image, the stretchable display having a band shape; a case on an inwardly facing side of the stretchable display; holes on an outwardly facing surface of the case that is not overlapped by the stretchable display; and a stopper on an inwardly facing surface of the case, the stopper being coupleable with any one of the holes to loop the stretchable display device in a ring form, wherein a size of an image display area of the stretchable display is controllable based on a current value that depends on a position of a hole to which the stopper is coupled.

The case may include a resistor of which a resistance value is changeable depending on the position of the stopper; a power supply connected to the resistor; and an ampere meter to measure the value of the current flowing in the resistor, the ampere meter being connected to the power supply, and the resistor, the power supply, and the ampere meter may form a closed circuit with the stopper when the stopper is coupled with the hole.

The case may further include a controller to control the size of the image display area of the stretchable display based on the current value measured by the ampere meter.

When the stretchable display is disposed in a middle area of the case, the holes may include upper holes on an upper part of the middle region and lower holes on a lower part of the middle region, the stopper may include an upper stopper and a lower stopper, and one of the upper holes and a laterally adjacent one of the lower holes may configure one pair, and the upper hole and the lower hole of the one pair are coupled with the upper stopper and the lower stopper of the stopper.

The embodiments may be realized by providing a stretchable display device including a stretchable display to display an image, the stretchable display having a band shape; a first case on a first side of the stretchable display, the first case having a band shape; first holes on an outwardly facing surface of the first case; and a stopper on an inwardly facing surface of the first case, the stopper being coupleable with any one of the first holes to loop the stretchable display device in a ring form, wherein a size of an image display area of the stretchable display is controllable based on a current value that depends on a position of a first hole to which the stopper is coupled.

The first case may include a resistor of which a resistance value is changeable depending on the position of the stopper; a power supply connected to the resistor; and an ampere meter to measure the value of the current flowing in the resistor, the ampere meter being connected to the power supply, the resistor, the power supply, and the ampere meter form a closed circuit with the stopper when the stopper is coupled with the first hole.

The first case may further include a controller to control the range of the image display area of the stretchable display based on the current value measured by the ampere meter.

The stretchable display device may further include a second case on a second side of the stretchable display; and second holes on an outwardly facing surface of the second case, wherein the stopper includes an upper stopper and a lower stopper, and one of the first holes and a laterally adjacent one of the second holes configure one pair, and the first hole and the second hole of the one pair are coupled with the upper stopper and the lower stopper of the stopper.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
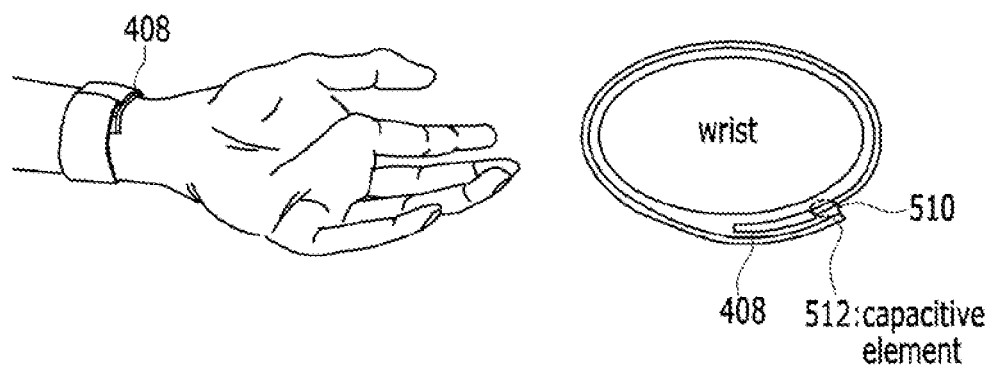
FIG. 1 illustrates a diagram showing an example of a wrist type wearable display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Terms used in the present specification are used only in order to describe specific exemplary embodiments rather than limiting the present disclosure. Singular forms are to include plural forms unless the context clearly indicates otherwise. It will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof Throughout this specification and the claims that follow, when it is described that an element is "coupled" to another element, the element may be "directly coupled" to the other element or "electrically or mechanically coupled" to the other element through a third element.

Unless being defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A display having an information transfer function as a main function has become diverse to a commercial digital information display (DID) and mobile devices by way of from a TV and a monitor (MNT). The recent change of the display which is an irreversible trend in this change is that the display which a user is watching at a predetermined distance is inclined to be gradually physically close to the user. A representative example of the display may include a mobile phone, a tablet PC, etc. Recently, research and development into a wearable display that may be worn on a user's body (rather than carried) has been actively conducted.

In some wearable devices, a flexible display, a stretchable display, or the like may be used together with a rigid or inflexible display structure.

For example, a wrist type device (or wristwatch wearable display device) which has been mainly commercialized may be mostly configured of a display implementing portion and a band portion fixed to a wrist. Therefore, the wearable device may not have a large difference from a current state in which a user wears a watch or mostly has a wrist band form having a predetermined size to be worn regardless of a user.

The future of wearable devices may include devices that may be stretched while the display itself has flexibility, and thus a separate band may be omitted.

FIG. 1 illustrates a diagram showing an example of a wrist type wearable display device.

FIG. 1 illustrates a device that recognizes, senses, or detects a point where displays overlap each other (depending on a thickness or circumference (size) of a user's wrist) to make a screen of the display continuously be displayed, when a wearable device configured of only a display without a band is worn on a wrist.

Figure 2:
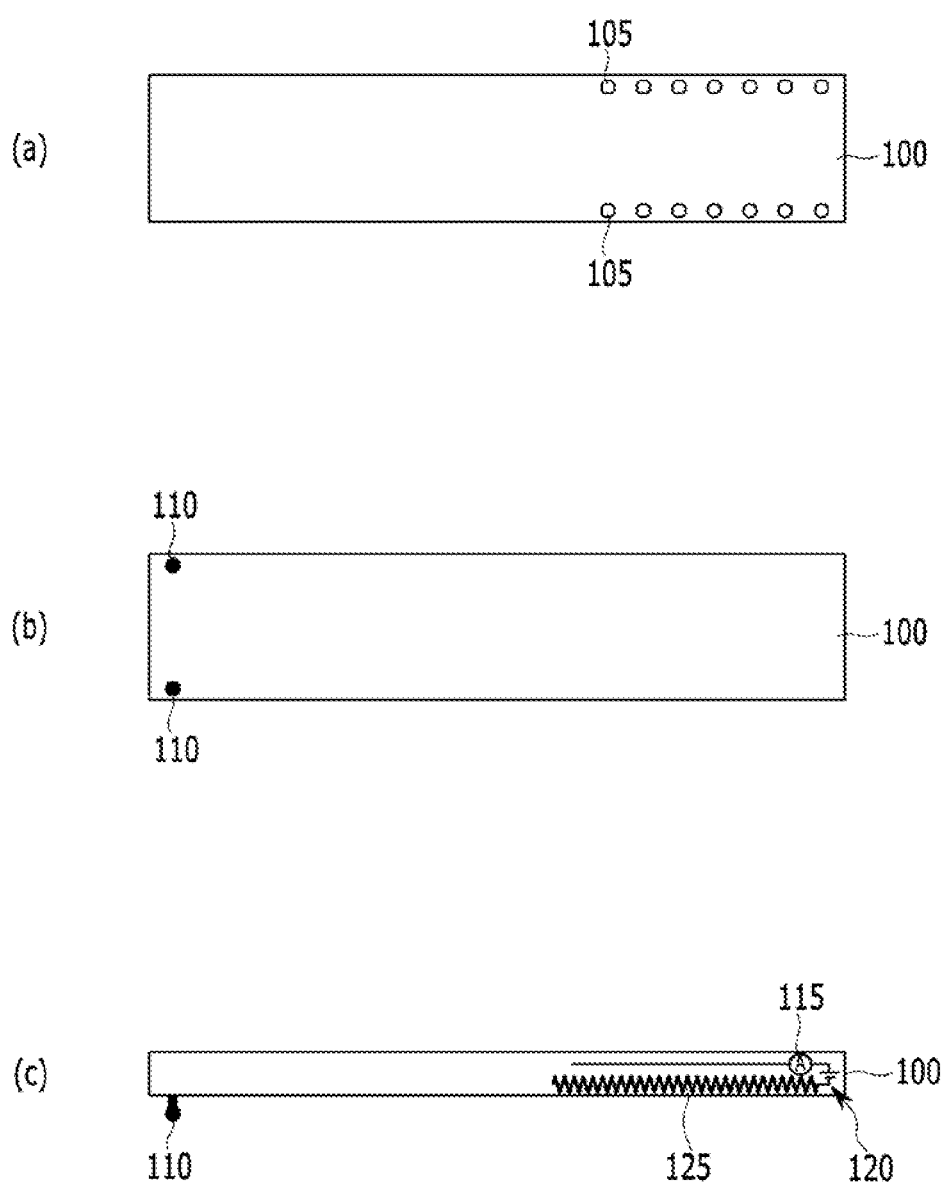
FIGS. 2(a) to 2(c) illustrate a stretchable display device according to an embodiment.

To recognize a display end position, the device may have an end provided with a capacitive element 512 to sense or detect the position based on a change in a charging rate in an electrode of a touch panel on a display surface, FIGS. 2(a) to 2(c) illustrate a stretchable display device according to an exemplary embodiment.

Referring to FIGS. 2(a) to 2(c), FIG. 2(a) illustrates an upper or outer surface of the stretchable or flexible display device, FIG. 2(b) illustrates a lower or inner surface of the stretchable display device, and FIG. 2(c) illustrates a side view of the stretchable display device.

The stretchable display device may be a band type display device and may be an automatic controlling device of a display size, depending on a user, to control a range or size of a display area of a display.

The stretchable display device may include a stretchable display (or stretchable display unit) 100, holes 105, and a stopper (e.g., fixed pin or cover) 110.

The stretchable display 100 may have a band form or shape (e.g., stripe form or shape) and may display an image (or picture). The stretchable display 100 may display, e.g., a two way display, which may display an image up and down.

The holes 105 may be formed on the upper surface of the stretchable display 100.

The stopper 110 may be coupled with (e.g., inserted into) a suitable one or ones of the holes 105, depending on a size of an object that is attached to or surrounded by the stretchable display device. For example, the stopper 110 may be coupled with the hole(s) 105 to make the stretchable display 100 form in a ring (or loop) shape. The stopper 110 may be on the lower surface of the stretchable display 100 as illustrated in FIG. 2(b).

As illustrated in FIGS. 2(a) to 2(c), the range or size of the image display area of the stretchable display 100 may be controlled, changed, or selected by using or based on a current value that varies (is changed) depending on the position of the stopper 110 coupled with the holes 105.

As illustrated in FIG. 2(c), the stretchable display 100 may include a resistor 125, a power supply (e.g., a DC power supply) 120, and an ampere meter (ammeter) 115.

The resistor 125 may have a variable resistance depending on the position of the stopper 110. The resistor 125 may be connected to the holes 105.

Figure 4:
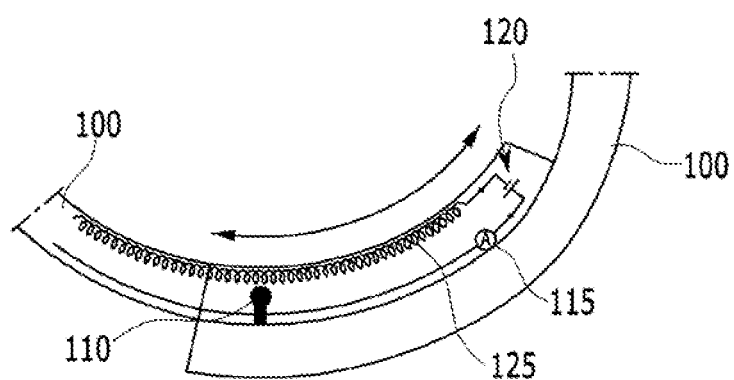
FIG. 4 illustrates a diagram showing an exemplary embodiment of the stretchable display device of FIG. 3.

The power supply (e.g., DC power supply) 120 may be electrically connected to the resistor 125. The ampere meter 115 may be connected to the power supply 120 and may measure current that flows in the resistor 125. As illustrated in FIG. 4, the resistor 125, the power supply 120, and the ampere meter 115 may form a closed circuit by or through the stopper 110, e.g., when the stopper 110 is coupled with the hole(s) 105 (which are connected to the resistor 125).

The stretchable display 100 may include a controller (or processor) that uses the current value measured by the ampere meter 115 to control the range or size of the image display area of the stretchable display 100.

As described above, according to the exemplary embodiment, as a device such as a wrist type wearable device of which a whole front surface (upper or outer surface) includes the stretchable display (e.g., without a separate, non-displaying band portion), a stopper which is a conductor (e.g., a metal conductor) which may be inserted into the hole at the time of wearing to be fixed to fit for the thickness or circumference (size) of the user's wrist may be present on the lower or inner surface of the wrist type wearable device. The hole may be formed on the upper or outer surface of the stretchable display device 100. The hole with which the stopper is coupled may be selected depending on the thickness or circumference of the user's wrist. As illustrated in FIGS. 2(a) to 2(c), an open circuit (to which the ampere meter 115 is connected) may be disposed at a lower or end part of the upper surface on which the hole is positioned. One side of the circuit may be connected to the resistor 125. Therefore a length of the resistor 125 of the circuit may be changed, depending on the position of the selected hole 105 to which the stopper 110 is connected.

The display of FIGS. 2(a) to 2(c), which is configured of only a display driving region may be driven in a ring form (like a cylindrical form). For example, two end portions of the display may meet or overlap each other and may have the hole 105 and the stopper 110 (which are fixers that may help prevent the overlapped portion from being unfolded).

The display 100 of FIGS. 2(a) to 2(c) may include a material (e.g., plastic such as polyimide (PI), a polyester (PET), and polyethylenenaphthalate (PEN) or polydimethylsiloxane (PDMS)) of which the length may be changed by or in response to an external force.

According to another exemplary embodiment, as illustrated in FIG. 2(a), the holes 105 may include upper holes that are formed (or disposed) on the upper part of the upper surface of the stretchable display 100 and lower holes which are formed on the lower part of the upper surface of the stretchable display. For example, the upper holes may be adjacent to one long edge of the stretchable display 100 and corresponding lower holes may be aligned with upper holes and adjacent to the opposing long edge of the stretchable display 100. One of the upper holes and one of the lower holes (e.g., laterally adjacent ones of the upper and lower holes) may configure or be designated as one pair, and the upper hole and the lower hole include in the one pair may be coupled with an upper stopper and the lower stopper of the stopper 110. For example, the upper stopper and lower stopper may be inserted into a designated pair of the upper holes and lower holes. For example, the upper stopper maybe adjacent to the one long edge of the stretchable display 100 and the lower stopper may be aligned with the upper stopper and may be adjacent to the opposing long side edge of the stretchable display such that, when the stretchable display is folded around to form a ring, the upper stopper and lower stopper may be aligned with and inserted into a corresponding pair of the upper holes and lower holes.

Figure 3:
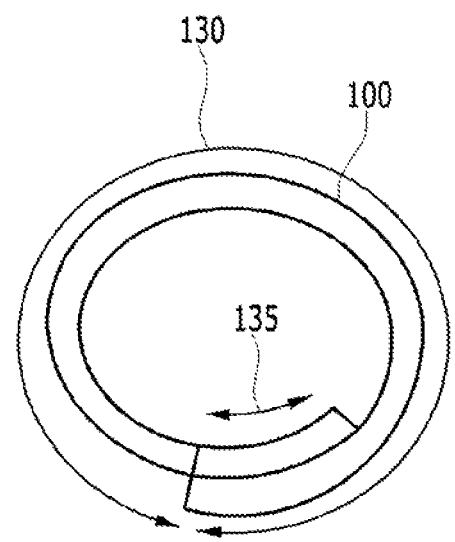
FIG. 3 illustrates a diagram showing an exemplary embodiment of a case in which the stretchable display device of FIGS. 2(a) to 2(c) is worn on a user's wrist.

FIG. 3 illustrates a diagram showing an exemplary embodiment of a case in which the stretchable display device illustrated in FIGS. 2(a) to 2(c) is worn on a user's wrist. For example, FIG. 3 illustrates a display implementing region when the stretchable display device wears a wrist.

Referring to FIG. 3, the region of the stretchable display device 100 may be divided into or include a display on area 130 (in which the display 100 is driven, e.g., to display an image) and a display off area 135 (in which the display 100 is not driven).

FIG. 4 illustrates a diagram showing an exemplary embodiment of the stretchable display device illustrated in FIG. 3. FIG. 4 illustrates a method for detecting an overlapped point to thereby display only at remaining parts (other than the overlapped portion that is determined due to a thickness of a wrist (size or circumference of a wrist)) by a display when the stretchable display device is worn on the user's wrist.

Referring to FIG. 4, when the device of FIGS. 2(a) to 2(c), the whole of which is configured of the stretchable display is worn on the wrist, the, e.g., size of the, overlapped portion may be changed depending on the thickness or circumference of the user's wrist. In this case, to accurately determine the extent or size of the overlapped portion, the value of current that flows in a wiring (e.g., the wiring including the resistor 125, the power supply 120, and the ampere meter 115) for detecting the size of the wrist on which the device of FIGS. 2(a) to 2(c) may be used.

The stopper 110 (in the internal wiring for detecting a size of a wrist) may form or may be a part of the internal wiring as a completely closed circuit while playing a role of a switch. For example, the stopper 110 may close the circuit that also includes the resistor 125, the power supply 120, and the ampere meter 115. For example, the stopper 110 may be a portion of a circuit which is configured as the internal wiring, when the stopper 110 is coupled with the holes. For example, a length of the wiring (resistor 125) through which current flows may be changed depending on the position of the stopper 110 (contact position of the resistor 125 through the hole 105 of the stopper 110) and the value of current flowing in the circuit may be changed correspondingly.

An accurate position of the stopper may be figured out by a controller based on the current value (or resistance value). Therefore, the controller may drive the display in the remaining regions 130 of the stretchable display 100 (e.g., other than the portion 135 of the stretchable display corresponding with the length of the overlapped display illustrated by left and right arrows in FIG. 4) to implement the display that is seamlessly connected as a whole. For example, the controller may use the current value to determine the portion where the displays overlap each other so as to determine the extent of the desired display driving region and to drive an image only in the exposed portions of the stretchable display 100.

For example, a length of the display on area 130 (or display off area 135) illustrated in FIG. 3 may be calculated by the controller using the change in the current value that depends on the change in the resistance value. For example, the implementation length of the display of FIGS. 2(a) to 2(c) may be changed depending on the current value (which ultimately depends on the position of the stopper 110 in the holes 105).

The embodiments may include a display device that detects a point where (e.g., ends of) the displays overlap each other using a current value (or resistance value) depending on the change in the length of the resistance value, and controls the display driving region using the same, as a display device which may be implemented as a wrist type wearable display or a cylindrical form.

Figure 5:
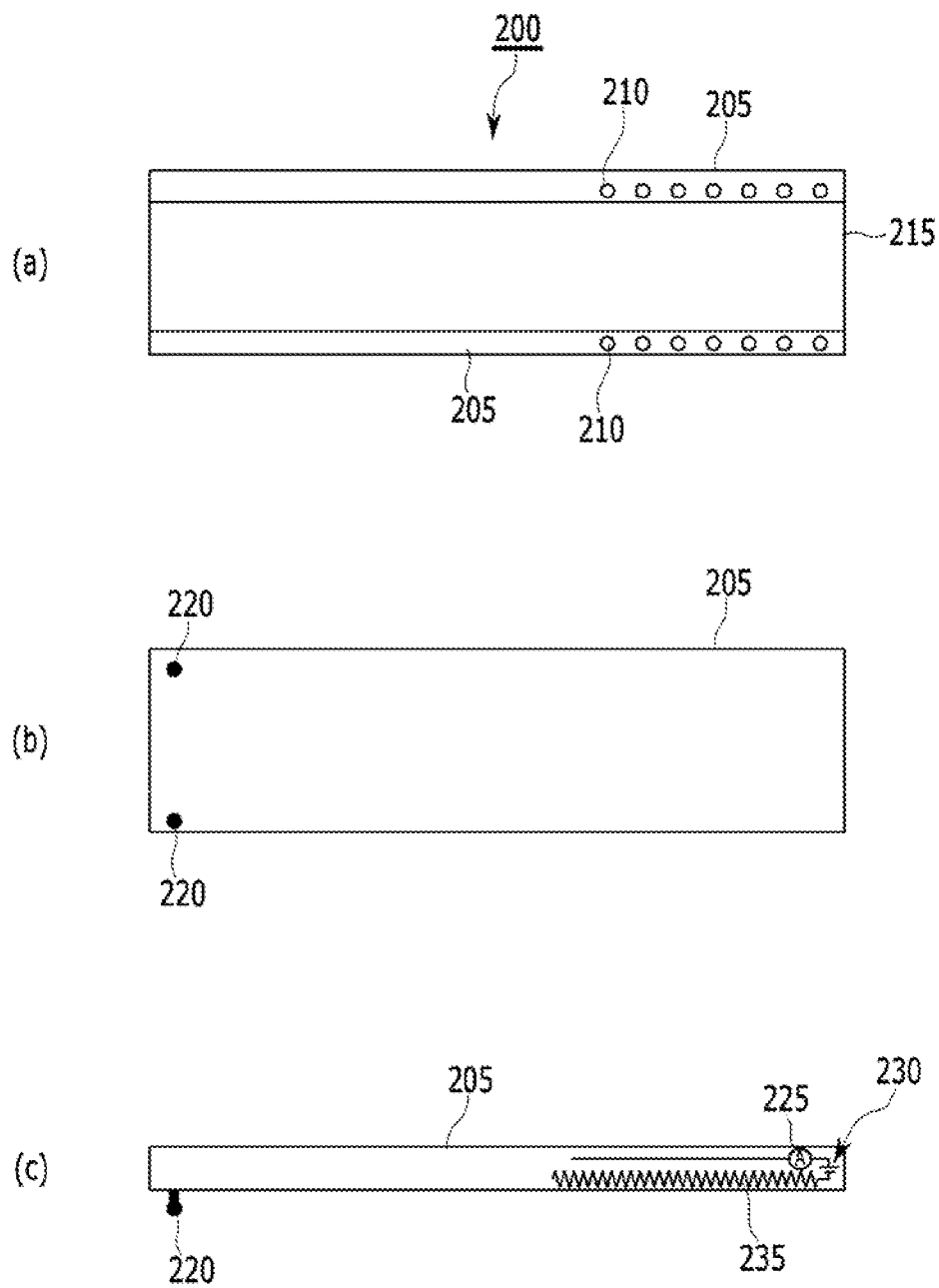
FIGS. 5(a) to 5(c) illustrate a stretchable display device according to another embodiment.

FIGS. 5(a) to 5(c) illustrate diagrams describing a stretchable display device according to another exemplary embodiment. FIGS. 5(a) to 5(c) illustrate an exemplary embodiment in which the stopper is formed in a case.

Referring to FIGS. 5(a) to 5(c), FIG. 5(a) illustrates an upper surface or outer surface of a stretchable or flexible display device 200, FIG. 5(b) illustrates a lower surface or inner surface of the stretchable display device 200, and FIG. 5(c) illustrates a side of the stretchable display device 200.

The stretchable display device 200 may be a band type display device and may be an automatic controlling device of a display size depending on a user to control a range or size of a display area.

The stretchable display device 200 may include a stretchable display (or stretchable display unit) 215, a case 205, holes 210, and a stopper (e.g., a fixed pin) 220.

The stretchable display 215 may have a band form or shape (e.g., a stripe form) and may display an image (or picture). The stretchable display 215 may include a material (e.g., a plastic such as polyimide (PI), polyester (PET), and polyethylenenaphthalate (PEN) or polydimethylsiloxane (PDMS)) of which the length may be changed by or in response to an external force.

The case 205 may be formed (or disposed) under the band-shaped stretchable display 215. For example, the case 205 may be on an inner or user's wrist side of the stretchable display device 200. As illustrated in FIGS. 5(a) to 5(c), the case 205 may also have a band shape.

The holes 210 may be formed on an upper or outwardly facing surface of the case 205, e.g., on which the stretchable display 215 is not disposed.

The stopper 220 may be coupled with (or inserted into) any of the holes 210, depending on a size of an object which is attached to the stretchable display device 200 to make the stretchable display 215 (or case 205) form in a ring form. The stopper 220 may be formed on the lower surface (e.g., inwardly facing surface) of the case 205, as illustrated in FIG. 5(b).

As illustrated in FIG. 3, the range or size of the image display area of the stretchable display 215 may be controlled by using a current value which varies (is changed) depending on the position of the stopper 220 which is coupled (or inserted) with (into) any one of the holes 210

As illustrated in FIG. 5(c), the case 205 may include a resistor 235, a power supply (e.g., DC power supply) 230, and an ampere meter 225.

The resistor 235 may have a variable resistance depending on the position of the stopper 220. The resistor 235 may be connected to the holes 210.

The power supply (e.g., DC power supply) 230 may be electrically connected to the resistor 235. The ampere meter 225 may be connected to the power supply 230 and may measure the value of current that flows in the resistor 235. The resistor 235, the power supply 230, and the ampere meter 225 may form a closed circuit with the stopper 220 that is coupled with (e.g., inserted into) the holes 210 that are connected to the resistor 235, in the same manner as illustrated in FIG. 4.

The case 205 may include a controller (e.g., processor) that uses the current value measured by the ampere meter 225 to control the range or size of the image display area of the stretchable display 215.

FIGS. 5(a) to 5(c) illustrate an exemplary embodiment of the device 200 in which the case 205 on a rear surface of the display 215 (having a stretching characteristic and having the stopper 220 and the hole 210 formed therein) and the display 215 are integrated. The stopper, the hole, and the like may be manufactured or provided outside of the display 215 (having a complicated internal structure), and therefore manufacturing performance of the display device may be improved.

A material of the case 205 may have the same stretching characteristic as the stretchable display 215. The case 205 may include, e.g., a polydimethylsiloxane (PDMS) material having good stretchability. A material of the case 205 may include, e.g., plastic such as polyimide (PI), polyester (PET), polyethylenenaphthalate (PEN), polycarbonate (PC), and polysulfone (PES).

The embodiments may provide a display portion in which the image is driven and the case is around the display portion, and thus is driven in a form like a cylindrical form in which two ends of the display meet or overlap each other. The device according to an embodiment may include the case 205 in which the hole 210 and the stopper 220 which are the fixers or fasteners for preventing the overlapped portion from being unfolded. The embodiments may also include the case 205 having a circuit of which the current value is changeable in response to the resistance value which is determine by the contact position of the stopper.

According to another exemplary embodiment, when the stretchable display 215 is disposed in a middle area of the case 205, as illustrated in FIG. 5(a), the holes 210 may include upper holes which are formed on an upper portion in the middle area and lower holes which are formed at the lower part of the middle area. Each of the upper holes and each of the lower holes may configure one pair, and the upper hole and the lower hole which are include in the one pair may be coupled with the upper stopper and the lower stopper which are included in the stopper 220. For example, the upper stopper and the lower stopper may be inserted into corresponding ones of the upper holes and lower holes.

Figure 6:
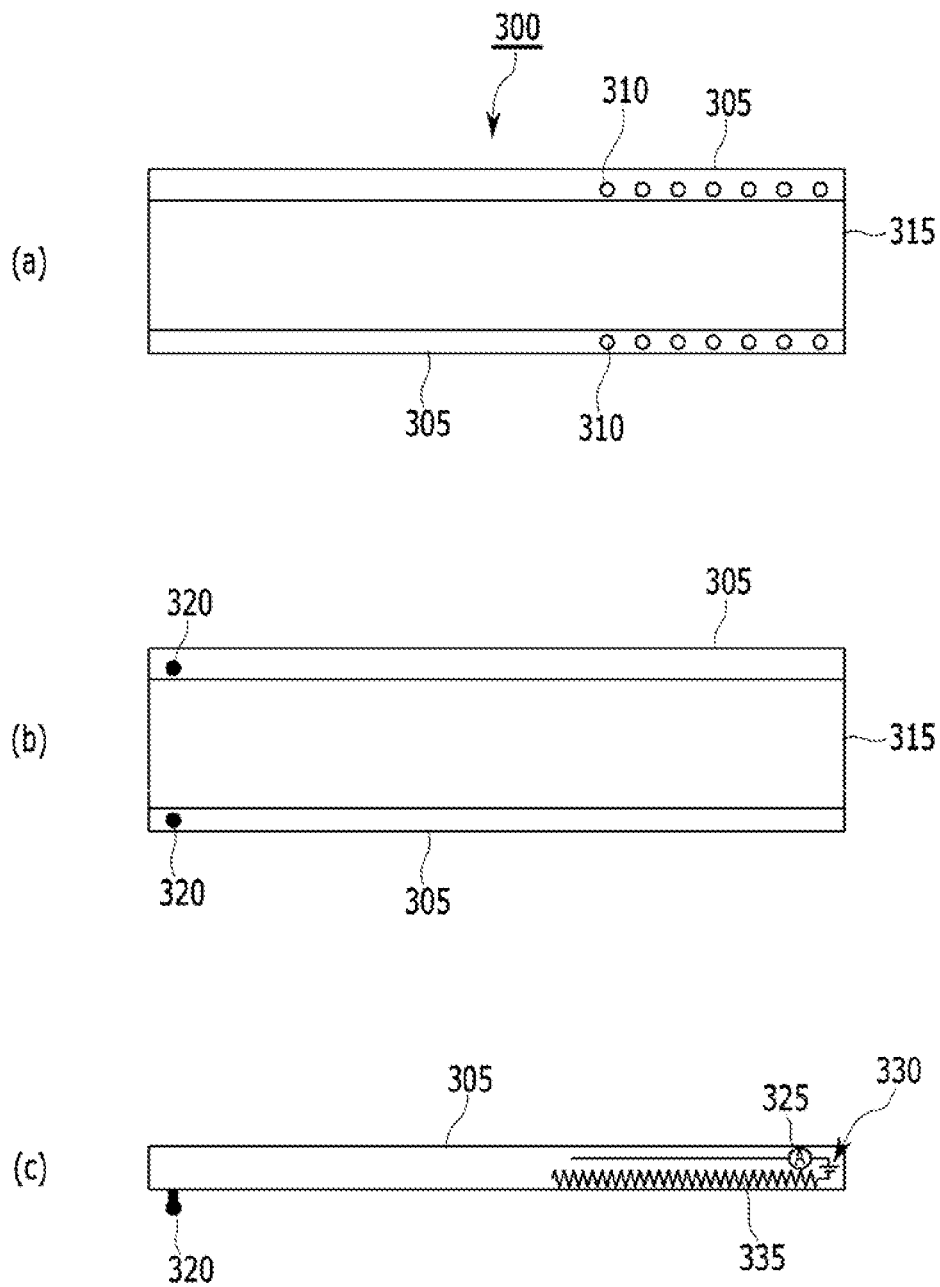
FIGS. 6(a) to 6(c) illustrate a stretchable display device according to another embodiment.

FIGS. 6(a) to 6(c) illustrate the stretchable display device according to another exemplary embodiment. FIGS. 6(a) to 6(c) illustrate the exemplary embodiment in which the stopper is formed in the case.

Referring to FIGS. 6(a) to 6(c), FIG. 6(a) illustrates an upper or outwardly facing surface of a stretchable or flexible display device 300, FIG. 6(b) illustrates a lower or inwardly facing surface of the stretchable display device 300, and FIG. 6(c) illustrates a side of the stretchable display device 300.

The stretchable display device 300 may be a band-shaped display device and may be an automatic controlling device of a display size depending on a user to control a range of a display area of a display.

The stretchable display device 300 may include a stretchable display (or stretchable display unit) 315, a case 305, holes 310, and a stopper (e.g., a fixed pin) 320.

The stretchable display 300 may have a band shape (e.g., stripe shape) and may display an image (or picture). The stretchable display 300 may include a material (e.g., plastic such as polyimide (PI), polyester (PET), and polyethylenenaphthalate (PEN) or polydimethylsiloxane (PDMS)) of which the length may be changed by an external force. The stretchable display 300 may display, e.g., a two way display which may display an image up and down.

The first case 305 may be formed (or disposed) on a first side (or right side) of the stretchable display 315 and, as shown in FIGS. 6(a) to 6(c), may have a band shape.

The first holes (or upper holes) 310 may be formed on an upper surface or outwardly facing surface of the first case 305.

The stopper 320 may be coupled with (e.g., inserted into) any one of the first holes 310, depending on a size of an object that the stretchable display device 300 is attached to in order to make the stretchable display 315 (or case 305) form in a ring form. The stopper 320 may be formed on the lower (e.g., inwardly facing or user's wrist facing) surface of the first case 305 as illustrated in FIG. 6(b).

As illustrated in FIG. 3, the range or size of the image display area of the stretchable display 315 may be controlled by using a current value that varies (e.g., that is changeable) depending on the position of the stopper 320 that is coupled with, e.g., inserted into, any one of the holes 310

As illustrated in FIG. 6(c), the first case 305 may include a resistor 335, a power supply (e.g., DC power supply) 330, and an ampere meter 325.

The resistor 335 may have a variable resistance depending on the position of the stopper 320, e.g., depending on which of the holes 310 the stopper 320 is inserted into. The resistor 335 may be connected to the holes 310.

The power supply (e.g., DC power supply) 330 may be electrically connected to the resistor 335. The ampere meter 325 may be connected to the power supply 330 and may measure the value of current which flows in the resistor 335. The resistor 335, the power supply 330, and the ampere meter 325 may form a closed circuit with the stopper 320 that is coupled with (e.g., inserted into) the holes 310 that are connected to the resistor 335, by the same manner as one illustrated in FIG. 4.

The first case 305 may include a controller (or processor) that uses the current value measured by the ampere meter 325 to control the range or size of the image display area of the stretchable display 315.

FIGS. 6(a) to 6(c) illustrate an exemplary embodiment of the device 300 in which the case 305 disposed on a side surface of the display 315, having a stretching characteristic, and having the stopper 320 and the hole 310 formed therein and the display 315 are integrated. The stopper, the hole, and the like may be manufactured outside the display 315 (having a complicated internal structure), and therefore manufacturing performance of the device may be improved.

A material of the case 305 may have the same stretching characteristic as the stretchable display 315. The case 305 may include, e.g., a polydimethylsiloxane (PDMS) material having good stretchability. A material of the case may include, e.g., plastic such as polyimide (PI), polyester (PET), polyethylenenaphthalate (PEN), polycarbonate (PC), and polysulfone (PES).

The device according to an embodiment may include a display portion (in which the image is driven) and a case disposed therearound. Thus, the device may be driven in a form like a cylindrical form in which two ends of the display meet or overlap each other and may include the case 305 in which the hole 310 and the stopper 320 (which are the fixers or fasteners for preventing the overlapped portion from being unfolded). The device may include the case having a circuit of which the current value is changed in response to the resistance value which is changed due to the contact of the stopper.

According another embodiment, the stretchable display device 300 may further include the second case 305 which is formed (or disposed) on a second side (e.g., opposite or left side) of the stretchable display 315, and second holes 310 (or lower holes) which are formed on the upper surface of the second case 305.

One of the first holes and a corresponding one of the second holes may configure or be designated as one pair. The first hole and the second hole of the one pair may be coupled with the upper stopper and the lower stopper which are included in the stopper 320, e.g., the upper stopper and lower stopper may be inserted into a corresponding one of the upper hole and lower hole of the one pair.

By way of summation and review, some display devices use a glass substrate, which may bear high temperature generated during the manufacturing process, and therefore may have a limitation in implementing weight reduction, thinness, or flexibility.

As a result, a flexible display device that is manufactured to keep display performance intact even though bent (like paper) by using a material with flexibility which may be folded and unfolded like a plastic film, etc., instead of using the glass substrate (without flexibility) has recently emerged as a next-generation flat panel display. The flexible display may be thin and light and strong against impact, may be warped or bent to be carried while being folded and rolled, and may be manufactured in various forms, such that the utilization of the flexible display is endless.

Further, with the recent development of display related technologies, the display devices which may be changed in use, such as being folded, rolled in a roll form, and stretched in at least one direction, have been researched and developed. These displays may be changed in various forms, and therefore may satisfy both a demand for a large-size display and a demand for a small-size display for portability in use.

A changeable display device may be changed to a predefined form in advance and/or may be changed to various forms to respond to the user request or meet situations in which the display is used. Therefore, if a display area of the display were to be fixed, the display could be inconvenient to use. The display area of the display may be controllable by recognizing the changed form of the display.

The embodiments may provide a stretchable display device capable of controlling a display size.

The embodiments may provide a stretchable display device capable of controlling a display size or a display length.

According to an embodiment as described above, the stretchable display device may be a display such as the wearable display which may be worn on the user's wrist or forearm, or the like or the cylindrical display which may be driven by being attached to tools such as the cylindrical instruments (for example, cup) and detects a size of an object by a simple electrical wiring structure without needing to manufacturing a dedicated display depending on a size of the object to be attached, thereby controlling the display implementing area.

According to an embodiment, the stretchable display device may not implement or display the image at the portion where the displays overlap each other, in order to be able to reduce power consumption and to implement or display the image such that the image is continuous connected into one without a break.

Further, according to an embodiment, the stretchable display device may be applied to the user having different thicknesses (sizes) of wrist or forearm or tools, and the like, such as cylindrical instruments having various thicknesses (sizes) by using one display.

Components, "~ units", blocks, or modules used in the present exemplary embodiment may be implemented by software such as tasks, classes, sub-routines, processes, objects, execution threads, or programs performed in a predetermined region on a memory or hardware such as a field programmable gate array (FPGA) or an application-specific integrated circuit (ASIC) and may be implemented by a combination of the software and the hardware. The components, the "~ unit", or the like, may be included in a computer readable storage medium or may be dispersed and distributed in a plurality of computers.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

100: Stretchable display
105: Hole
110: Stopper
115: Ampere meter
120: Power supply
125: Resistor
130: Display on area
135: Display off area

What is claimed is:

1. A stretchable display device, comprising:
a stretchable display to display an image, the stretchable display having a band shape;
holes on an outwardly facing surface of the stretchable display; and
a stopper on an inwardly facing surface of the stretchable display, the stopper being coupleable with any one of the holes to loop the stretchable display device in a ring form,
wherein a size of an image display area of the stretchable display is controllable based on a current value that depends on a position of a hole to which the stopper is coupled.

2. The stretchable display device as claimed in claim 1, wherein:
the stretchable display includes:
a resistor of which a resistance value is changeable depending on the position of the stopper;
a power supply connected to the resistor; and
an ampere meter to measure the value of the current flowing in the resistor, the ampere meter being connected to the power supply, and
the resistor, the power supply, and the ampere meter form a closed circuit with the stopper when the stopper is coupled with the hole.

3. The stretchable display device as claimed in claim 2, wherein the stretchable display further includes a controller to control the size of the image display area of the stretchable display based on the current value measured by the ampere meter.

4. The stretchable display device as claimed in claim 1, wherein:
the holes include upper holes at one outer edge of the stretchable display and lower holes at an opposite outer edge of the stretchable display,
the stopper includes an upper stopper and a lower stopper, and
one of the upper holes and a laterally adjacent one of the lower holes configure one pair, and the upper hole and the lower hole of the one pair are coupled with the upper stopper and the lower stopper of the stopper.

5. A stretchable display device, comprising:
a stretchable display to display an image, the stretchable display having a band shape;
a case on an inwardly facing side of the stretchable display;
holes on an outwardly facing surface of the case that is not overlapped by the stretchable display; and
a stopper on an inwardly facing surface of the case, the stopper being coupleable with any one of the holes to loop the stretchable display device in a ring form,
wherein a size of an image display area of the stretchable display is controllable based on a current value that depends on a position of a hole to which the stopper is coupled.

6. The stretchable display device as claimed in claim 5, wherein:
the case includes:
a resistor of which a resistance value is changeable depending on the position of the stopper;
a power supply connected to the resistor; and
an ampere meter to measure the value of the current flowing in the resistor, the ampere meter being connected to the power supply, and
the resistor, the power supply, and the ampere meter form a closed circuit with the stopper when the stopper is coupled with the hole.

7. The stretchable display device as claimed in claim 6, wherein the case further includes a controller to control the size of the image display area of the stretchable display based on the current value measured by the ampere meter.

8. The stretchable display device as claimed in claim 5, wherein:
when the stretchable display is disposed in a middle area of the case,
the holes include upper holes on an upper part of the middle region and lower holes on a lower part of the middle region,
the stopper includes an upper stopper and a lower stopper, and
one of the upper holes and a laterally adjacent one of the lower holes configure one pair, and the upper hole and the lower hole of the one pair are coupled with the upper stopper and the lower stopper of the stopper.

9. A stretchable display device, comprising:
a stretchable display to display an image, the stretchable display having a band shape;
a first case on a first side of the stretchable display, the first case having a band shape;
first holes on an outwardly facing surface of the first case; and
a stopper on an inwardly facing surface of the first case, the stopper being coupleable with any one of the first holes to loop the stretchable display device in a ring form,
wherein a size of an image display area of the stretchable display is controllable based on a current value that depends on a position of a first hole to which the stopper is coupled.

10. The stretchable display device as claimed in claim 9, wherein:
  the first case includes:
    a resistor of which a resistance value is changeable depending on the position of the stopper;
    a power supply connected to the resistor; and
    an ampere meter to measure the value of the current flowing in the resistor, the ampere meter being connected to the power supply,
  the resistor, the power supply, and the ampere meter form a closed circuit with the stopper when the stopper is coupled with the first hole.

11. The stretchable display device as claimed in claim 10, wherein the first case further includes a controller to control the range of the image display area of the stretchable display based on the current value measured by the ampere meter.

12. The stretchable display device as claimed in claim 9, further comprising:
  a second case on a second side of the stretchable display; and
  second holes on an outwardly facing surface of the second case, wherein:
  the stopper includes an upper stopper and a lower stopper, and
  one of the first holes and a laterally adjacent one of the second holes configure one pair, and the first hole and the second hole of the one pair are coupled with the upper stopper and the lower stopper of the stopper.

\* \* \* \* \*